(12) United States Patent
Vaiciulis et al.

(10) Patent No.: US 8,121,962 B2
(45) Date of Patent: Feb. 21, 2012

(54) AUTOMATED ENTITY IDENTIFICATION FOR EFFICIENT PROFILING IN AN EVENT PROBABILITY PREDICTION SYSTEM

(75) Inventors: Anthony Vaiciulis, San Diego, CA (US); Larry Peranich, San Diego, CA (US); Uwe Mayer, Encinitas, CA (US); Scott Zoldi, San Diego, CA (US); Shane De Zilwa, Oakland, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 818 days.

(21) Appl. No.: 12/110,261

(22) Filed: Apr. 25, 2008

(65) Prior Publication Data
US 2009/0271343 A1 Oct. 29, 2009

(51) Int. Cl.
G06F 15/18 (2006.01)
G06E 1/00 (2006.01)
G06E 3/00 (2006.01)
G06G 7/00 (2006.01)

(52) U.S. Cl. ............................................... 706/21
(58) Field of Classification Search ..................... 706/21
See application file for complete search history.

(56) References Cited

U.S. PATENT DOCUMENTS 7,831,532 B2 * 11/2010 Horvitz ............................ 706/45
7,966,256 B2 * 6/2011 Liao et al. ........................ 705/44

OTHER PUBLICATIONS

Text generation from Taiwanese sign language using a PST-based language model for augmentative communication, Chung-Hsien Wu; Yu-Hsien Chiu; Chi-Shiang Guo; Neural Systems and Rehabilitation Engineering, IEEE Transactions on vol. 12 , Issue: 4 Digital Object Identifier: 10.1109/TNSRE.2003.819930 Publication Year: 2004 , pp. 441-454.*

* cited by examiner

*Primary Examiner* — Michael B Holmes
(74) *Attorney, Agent, or Firm* — Mintz Levin Cohn Ferris Glovsky and Popeo, P.C.

(57) ABSTRACT

A computer-implemented method and system for automated entity identification for efficient profiling in an event probability prediction system. A first subset of entities belonging to one or more entity classes is defined. At least one historical profile is constructed for each entity in the subset of entities based on a set of possible outcomes of transaction behavior of each entity in the first subset of entities. Based on the historical profiles, a second subset of entities having transaction behavior associated with a transaction is selected, the transaction behavior being predictive of at least one targeted outcome from the set of possible outcomes. The first subset of entities is redefined with the second subset of entities.

16 Claims, 10 Drawing Sheets

| ATM Terminal ID | Average number of transactions per hour with amount > $300 |
|---|---|
| 3289214... | 15.4 |
| 2398109... | 4.2 |
| 1934454... | 3.9 |
| 8378743... | 3.7 |
| 7523557... | 3.4 |
| 3546782... | 3.1 |
| 3303764... | 2.8 |
| 8821778... | 2.8 |
| 3110907... | 2.7 |
| 2245045... | 2.5 |
| Average | 4.2 |

FIG. 10

AUTOMATED ENTITY IDENTIFICATION FOR EFFICIENT PROFILING IN AN EVENT PROBABILITY PREDICTION SYSTEM

BACKGROUND

This disclosure relates generally to a computer-based, real-time system for event probability prediction that implements an efficient profiling technology which minimizes required computer resources and allows for the identification of entities exhibiting anomalous behavior.

Computer-based event probability prediction systems traditionally use some amount of historical information, a profile, about individual objects in order to compare present behavior with past behavior. Each of these objects is defined to be an entity, while a set of similar objects is defined to be an entity class. Examples of events to predict include whether or not a loan applicant will default on a loan and whether or not a credit card transaction is fraudulent. Examples of entities include a particular customer account at a bank and a particular Automatic Teller Machine (ATM).

To achieve high performance, an event probability prediction system often includes a mathematical model or combination of models which extracts patterns from historical data and uses the patterns on the present transaction data to calculate a score, a number that represents the likelihood that a particular event will occur. The model or models in the system traditionally need to store and access the profile for every existing entity in the entity class (e.g. every ATM being considered in the problem). Limitations of computer resources require that such a large amount of information is maintained in a disk-resident profile database, external to the computer program forming the core of the event probability prediction system. This leads to several issues in the development and running of the event probability prediction system:

1) It is necessary to create an interface between the mathematical model and the external database containing the profiles during development of the event probability prediction system.

2) It is necessary to create an interface between the mathematical model and the external database containing the profiles in the production environment in which the system will ultimately be used.

3) The system's capacity to process transactions may be severely limited due to the required interface with an external database.

Each of these issues could be a potential problem making the development and/or installation of the event probability prediction system infeasible.

Furthermore, in addition to the strain a traditional system places on the computer resources available, such a system may not allow the user to easily identify those entities which display a behavior of interest, particularly when multiple entity classes are being profiled to provide a multi-dimensional view of the data. Effective event probability prediction requires that only the minimum set of entities, a set whose membership varies over time, be profiled and maintained in a data store. It would be advantageous to provide a system and method that solves any of or any combination of the problems disclosed hereinabove.

SUMMARY

This document presents a new computer-based event probability prediction system and method that has two main advantages over previous systems. First, the new system uses computer resources more efficiently which allows it to achieve faster execution times and simplified implementation. Second, the new system allows for the identification and reporting of those entities which display anomalous behavior when viewed across multiple dimensions of the data and within a higher risk set of entities. The core of the system and method is a specialized profiling that efficiently maintains historical information only on a small number of entities rather than on all of the entities in a particular entity class. The resulting type of profile, a Concise Profile, uses Automated Entity Identification (AEI) which allows a large disk-resident profile database to be replaced with a small dynamic table stored in memory. A Concise Profile consists of 1) an online-updated, importance-ranked AEI table that contains the profile records for a concise subset of entities and 2) a recycling algorithm, based on an objective function related to the probability of a particular event, that determines the dynamic membership of the table. The system and method further calculates statistics on the AEI table to identify outliers, entities which exhibit anomalous behavior, to be reported to users of the system independent of the main score(s).

In one aspect, a computer-implemented method includes steps of defining a first subset of entities belonging to one or more entity classes, and constructing at least one historical profile for each entity in the subset of entities based on a set of possible outcomes of transaction behavior of each entity in the first subset of entities. Based on the historical profiles, a second subset of entities having transaction behavior associated with a transaction is selected, the transaction behavior being predictive of at least one targeted outcome from the set of possible outcomes. The method further includes the step of redefining the first subset of entities with the second subset of entities.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

FIG. 10 shows a table illustrating average transactions per hour of specific entities.

Like reference symbols in the various drawings indicate like elements.

DETAILED DESCRIPTION

Figure 1:
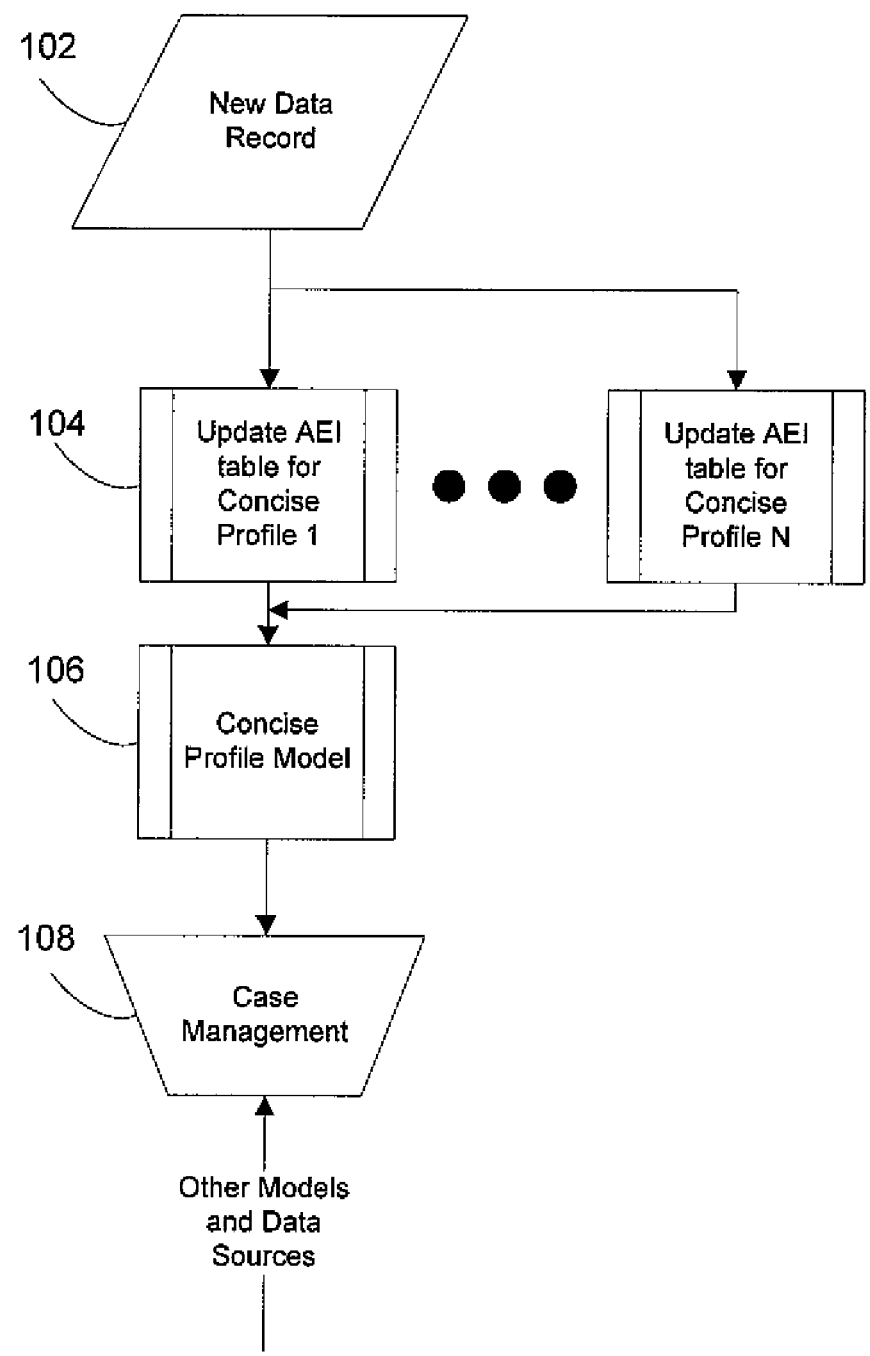
FIG. 1 shows an overview of the flow of data records through the event probability prediction system.

This document describes a computer-based, realtime system for event probability prediction implementing efficient profiling technology which minimizes required computer resources and allows for the identification of entities exhibiting anomalous behavior.

The invention applies to event probability prediction in general but to aid in the description the details of the invention are discussed below using a fraud detection system as a specific instance of the invention In the context of a fraud detection system, the system calculates, for example, the probability that a financial transaction is fraudulent.

In contrast to existing systems for fraud detection, the system described here uses a specialized profiling technology, called a Concise Profile, to efficiently maintain historical information only on a small number of entities at any given time rather than on all of the entities in an entity class. At the heart of the concept of a Concise Profile is Automated Entity Identification (AEI), which provides a way to replace a large, disk-resident profile database with a small dynamic table, of fixed maximum size, stored in memory rather than in an external database.

Whereas existing fraud detection systems maintain historical information for every entity in an entity class, a Concise Profile provides an online-updated, importance-ranked AEI table that contains profile records for a concise subset of entities whose dynamic membership is determined by a recycling algorithm, described in more detail below. This recycling algorithm is based on an objective function which uses criteria that are related to the probability that the transaction is associated with fraud.

Conceptually, each row in the AEI table corresponds to a single entity and contains two types of information: 1) information used to determine the rank of the entity in the table and 2) Concise Profile variables. The recycling algorithm ensures that entities exhibiting the behavior of interest (e.g. apparent fraud) have a consistently high rank in the AEI table, while other entities have a lower rank or may be removed from the table.

In addition to the benefits of reduced computer resource usage due to the maintenance of profiles for only a subset of all entities, the AEI table allows the invention to achieve something traditional systems are unable to do easily. The entities which are represented in the AEI table at any given time form a carefully selected, high-risk subset of the entire entity class by virtue of the recycling algorithm. One can compute statistics on this concise, ranked list of entity profiles to determine which entities, if any, are outliers in their behavior compared to all other entities represented on the list. In this sense the system provides the identities of those entities which exhibit anomalous (i.e. risky) behavior compared to other, already high-risk entities. As they do not require a large share of the computer resources, many Concise Profiles can be used simultaneously in a single fraud detection system. These profiles can be constructed to monitor many different entity classes and even different aspects of a single entity class by using a variety of recycling algorithms. The system can use information from the various AEI tables to detect anomalies that may only be visible when viewed from multiple dimensions (i.e. using multiple Concise Profiles). Furthermore, once an anomaly is detected, the identity of the corresponding entity is known and can be used in a separate, dedicated system to handle such anomalies or can be included in a report sent to a human fraud analyst. This ability to detect, identify, and report in real time or near real time on the entities which exhibit anomalous behavior when viewed from several dimensions gives the invention a significant advantage over traditional fraud detection systems.

An overview of the flow of data records through an example fraud detection system is shown in FIG. 1. Each new data record, received sequentially, corresponds to a single transaction involving the entity classes being used in the Concise Profiles. At least one Concise Profile table is required, but multiple Concise Profile tables, which each have a limited view into fraud, are required if multiple entity classes are being profiled as indicated in FIG. 1 and in other figures. First, a new data record 102 (e.g. an ATM transaction) to be evaluated for its likelihood of fraud enters the system. At step 104 the data in the record is used to update the AEI table for the entity class implemented as Concise Profile 1. In the case of multiple Concise Profiles, each one corresponds to a different entity class and each has a corresponding AEI table. All AEI tables are updated using information in the data record. The values of the variables stored in the AEI tables for the entities involved in the current transaction are output to the Concise Profile model at step 106 which uses the variables to evaluate (score) the record.

At step 108 the score and the input data record are passed to a case management system in which human fraud experts determine whether the record is actually a fraudulent record or a non-fraudulent record. The case management system allows the fraud expert to access other data sources including communicating with the legitimate person who is authorized to conduct the transaction (e.g. the credit card holder).

Figure 2:
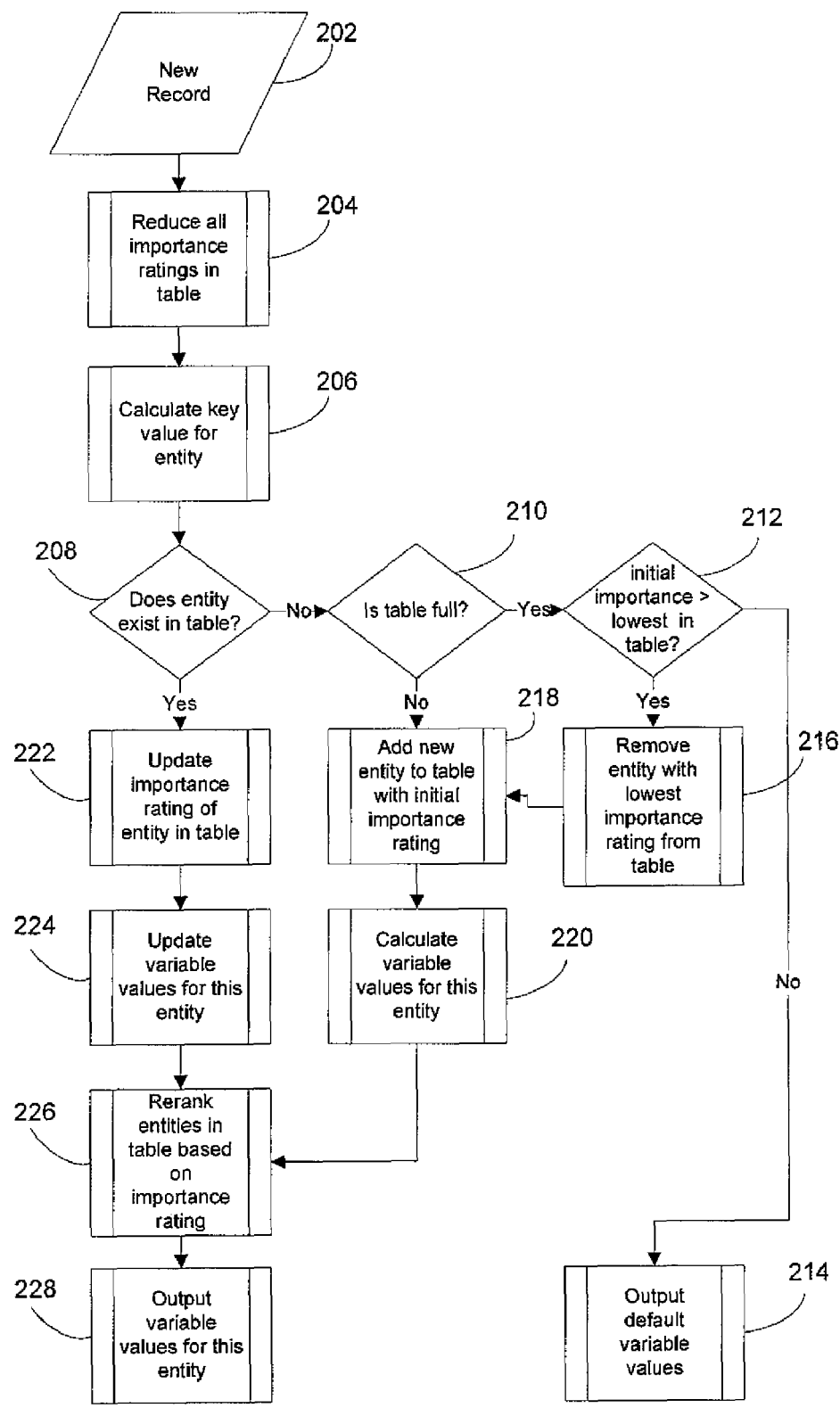
FIG. 2 shows the steps involved in updating the AEI table for the Concise Profile.

FIG. 2 illustrates the steps involved in updating the AEI table for the Concise Profile. After a new record 202 is presented to the system, at step 204 the system reduces the importance rating of each row in the AEI table. These importance ratings are used to rank order the entities represented in the table. The importance rating update procedure follows a mathematical formula which can be symbolized by the equation.

$$f_{new} = g(f_{old}, X)$$

where $f_{new}$ represents the new importance rating of a particular row in the table, $f_{old}$ represents the importance rating that takes into account all records up to but not including the new record, X represents the collection of information from the new record that may be useful in updating the importance rating, and g( ) represents the function whose output is the new importance rating.

As a simple example of an importance rating, the recycling algorithm may ensure that entities occurring in frequent or recent transactions have a consistently high rank in the AEI table, while other entities have a lower rank. In this case entities which occur rarely in transactions would have rare, short-lived appearances in the table. The importance rating then becomes equivalent to a frequency. To achieve this behavior, the updated frequency for each entity in the table can be recomputed on every input transaction according to the equation.

$$f_j = \alpha \times f_{j-1} + \beta_j$$

where $f_j$ and $f_{j-1}$ are the values of the decayed frequency for a particular entity in the table after the j'th and (J−1)'th transactions, $\alpha$ is a value between zero and one and is used to reduce all of the importance ratings in the table (step 204), and $\beta_j$ is zero if the j'th transaction did not involve the particular entity for which the decayed frequency is being computed or one if the j'th transaction did involve the particular entity for which the decayed frequency is being computed.

Updating the frequency in such a way that the most recent or frequent entities maintain high ranks may be beneficial, for example, when the system is attempting to detect frauds which manifest themselves as bursts of activity at particular Automatic Teller Machines (ATMs). In this scenario, the frequency can be related to different objective functions such as the number of transactions involving a card used for the first-time at the ATM, the number of transactions in which the amount is greater than some threshold, the number of transactions with a base model score greater than some threshold, etc.

On the other hand, one can imagine updating the frequencies such that the least frequently transacting entities maintain their high ranks. This would be useful for any fraud detection system in which the occurrences of the entities involved mostly follow some regular patterns which involve regular time intervals. A bank customer may regularly write checks every month to pay bills. These transactions would correspond to entities with low ranks in the AEI table, thus allowing the model to concentrate on the rarer transactions which are more likely to be fraudulent. Any other importance rating may be used in place of the frequency as needed to ensure that entities displaying the behavior of interest are kept in the AEI table.

At step 206 the system calculates a key value which uniquely identifies the entity within the entity class. At step 208 the system uses the key value to determine whether or not the entity is already represented in the AEI table.

If the entity is not already represented in the AEI table, then it becomes a candidate to be added with its importance rating set to a predetermined initial value. This addition occurs in one of the following two ways depending on whether or not the table is already full (i.e. all available rows are occupied), a determination made in step 210. If the table is full then in step 212 the system determines whether the initial importance rating is greater than the importance rating of the lowest-ranked entity in the table. If this condition is not satisfied, then at step 214 the system outputs the default values of the Concise Profile variables and the new entity will not have its profile record added to the table. It is possible to configure the system in such a way that the condition is always satisfied, so entities not found in the table always have their profile record added to the table. If the condition is satisfied then at step 216 the system removes the profile record for the lowest ranked entity in the table, which is the entity having the lowest frequency among all entities represented in the table. This step, together with step 204, ensures that profile records for entities which have low importance ratings will be replaced in the table by profile records for entities from more recent transactions. At step 218 the profile record for the new entity is added to the table with the initial importance rating value. If at step 210 it is determined that the table is not already full, then the system proceeds directly to step 218 in which the profile record for the new entity is added to the table with the initial importance rating value. At step 220 the Concise Profile variables defined for this entity class are calculated for this entity using information in the record 202.

If the profile record for the entity already exists in the AEI table, then from step 208 the system proceeds directly to step 222 in which the importance rating of the entity is increased. This step ensures that an entity with important behavior maintains a high rank in the table. At step 224 the Concise Profile variables defined for this entity class are updated for this entity using information in the record 202.

After the Concise Profile variables for the entity are either calculated for the first time (step 220) or updated (step 224), at step 226 the system re-ranks the entities represented in the table based on importance rating. At step 228 the system outputs the values of the Concise Profile variables for the entity.

One example of an entity that could be used in a fraud detection system is an ATM. For example, a criminal with a large number of counterfeit/stolen debit cards, each corresponding to a separate customer account, may successively use the cards at a single ATM to remove money from each account. This type of fraudulent behavior would cause the affected ATM to be highly ranked in the AEI table (assuming an importance rating update equation that emphasizes recent or frequent transactions) which would allow the fraud detection system at step 104 to maintain constantly updated Concise Profile variables describing the behavior of this particular ATM. Wisely constructed variables chosen to reflect differences between patterns of fraudulent behavior and patterns of non-fraudulent behavior would be evaluated by the Concise Profile model (step 106) and produce a score consistent with the transactions at this ATM being fraudulent. The advantages of the proposed fraud detection system are evident in this application when one considers that a traditional system might need to maintain profiles on hundreds of thousands of ATMs whereas the AEI table in the proposed system only needs to store information on a few hundred ATMs at any one time to achieve significant fraud detection capability. Furthermore, potential users of a system (e.g. banks) may not be able to afford maintaining a full profile database containing all ATMs in addition to the traditional full profile database containing all bank customers. To reduce costs users may be forced to choose a system which contains no ATM profiling, thereby losing sight of any ATM dynamics and restricting themselves to a one-dimensional, card-holder view of the data.

Figure 3:
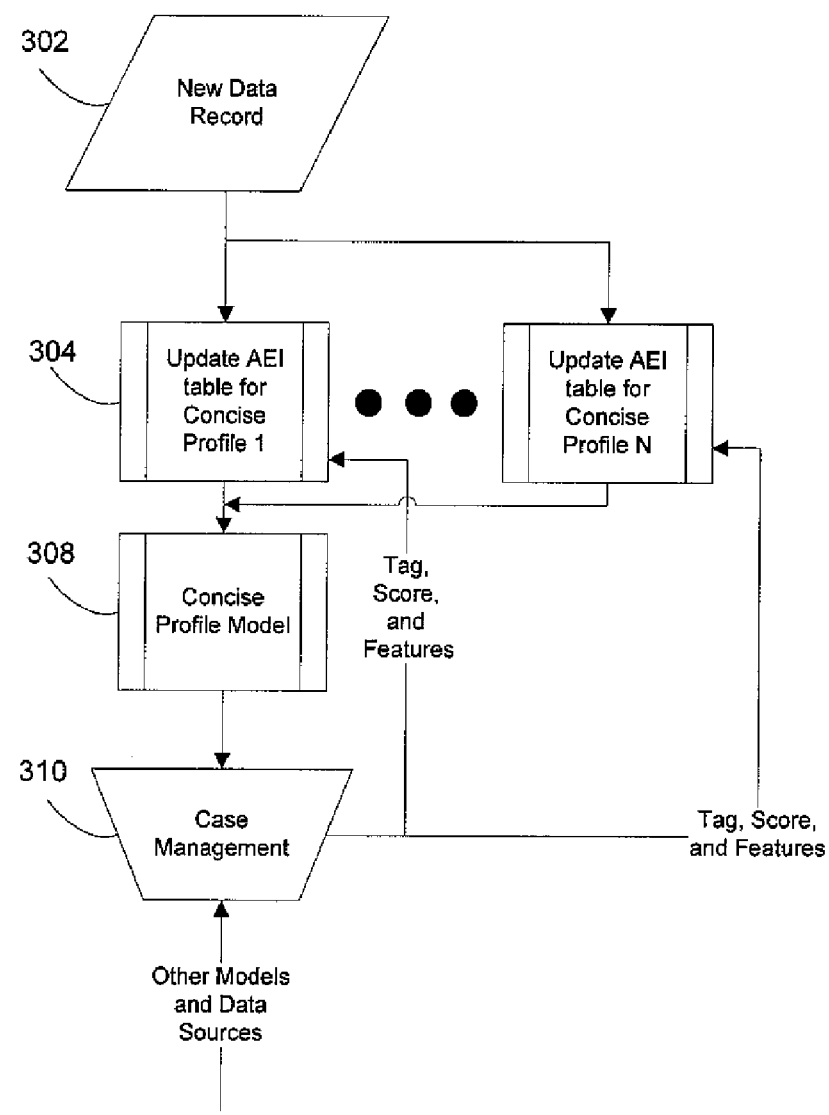
FIG. 3 shows a possible configuration of the system in which a feedback loop is added.

If the fraud patterns are static there is no need to create a system which monitors and reacts to changing patterns of fraud. In the real world in which the system must operate, however, fraud may be dynamic, manifesting itself in different ways at different times. FIG. 3 shows a possible configuration of the system identical to that shown in FIG. 1 except for the addition of a feedback loop in which information flows from case management at step 308 directly to the update of the AEI table at step 304. In the context of a fraud detection system being described here, the purpose of the feedback is to allow the system to rapidly incorporate new information on changing fraud patterns. The feedback consists of a confirmed fraud/nonfraud tag, the data for the record corresponding to the tag, and the model score for the record. The feedback improves the performance of the system in environments containing a significant amount of dynamic fraud. One of the uses of this technique is to update risk tables of different entities to reflect the most current fraud risk in the production environment.

Figure 4:
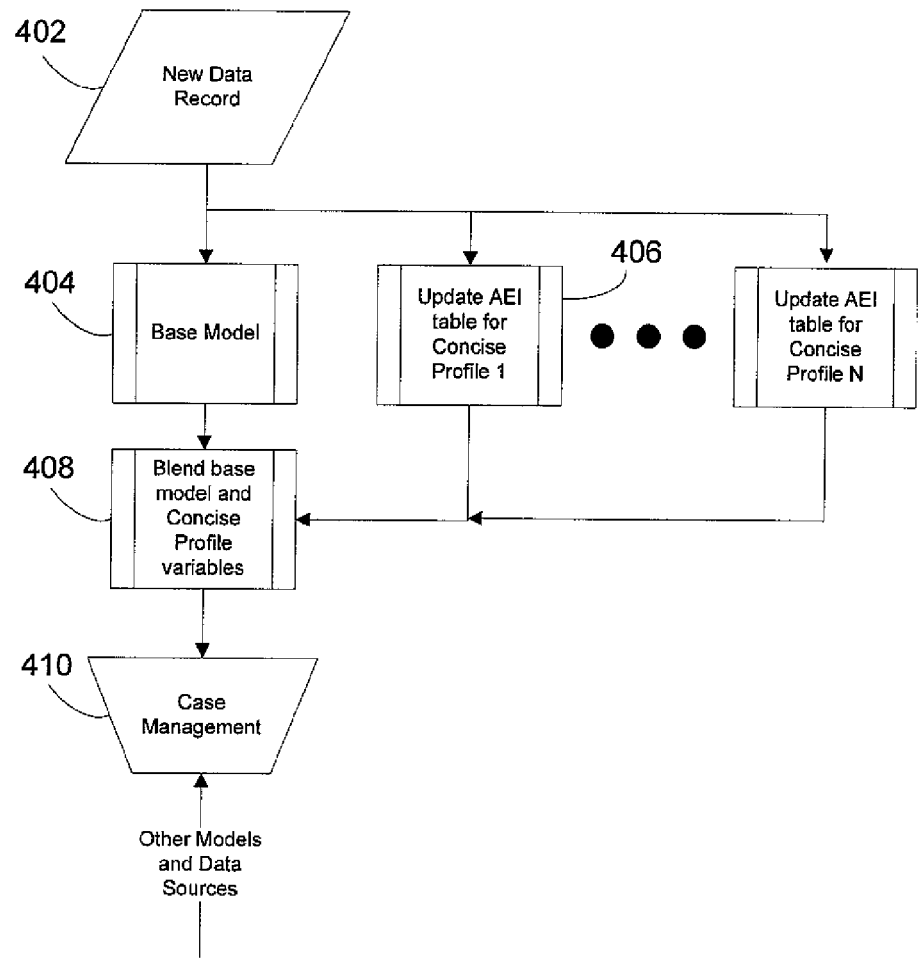
FIG. 4 shows a possible configuration of the system in which the Concise Profile variables are used to augment the output score of a base model.

An existing fraud detection system (one not using Concise Profiles) may contain one or more mathematical models which calculate a score representing the likelihood that the new data record corresponds to a fraudulent transaction. If these models, represented by the process labeled Base Model at step 404 in FIG. 4, already achieve a relatively high level of fraud detection then it may make sense to keep them in the system, using the Concise Profile variables to augment the base model output. This is depicted in FIG. 4. The new data record 402 is used as input both to the base model at step 404 and to the AEI table update at step 406. The output from step 404 includes the scores from each of those models as well as the values of the variables created by those models. The Concise Profile variables from step 406 are blended (mathematically combined) at step 408 with the output from the base model. In this way the system produces a final score which is sent to the case management step 410. The final blended score can more accurately estimate the likelihood of fraud than the base model score alone. For example, the base model may maintain profiles about individual bank customers while a Concise Profile may maintain historical information about individual ATMs. This difference enables the Concise Profile variables to capture a complementary dimension of the data which is likely to increase the performance of the final score over that of the base model.

Figure 5:
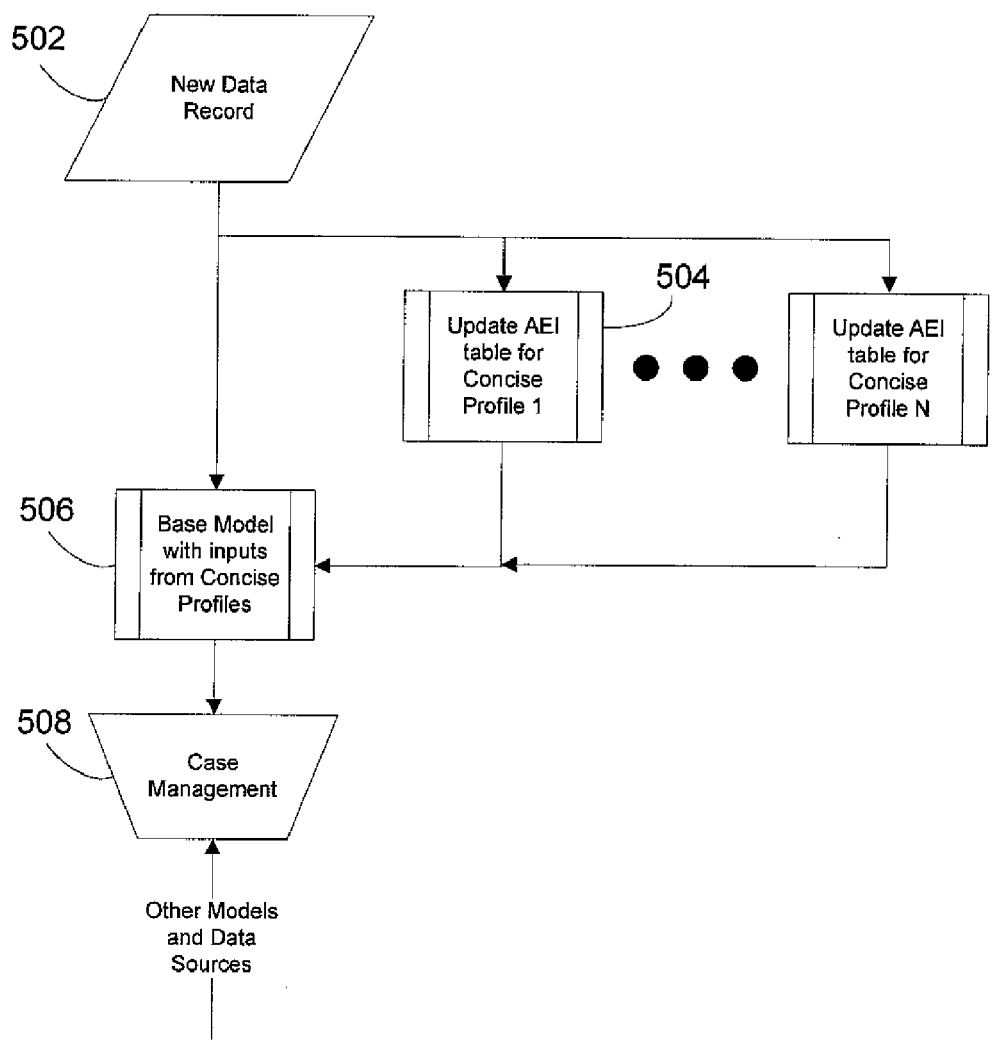
FIG. 5 shows a possible configuration of the system in which the Concise Profile variables are not blended with the base model output, but are used as input to the base model.

The base model may be sufficiently complex and flexible that it can handle the Concise Profile variables being used at its input. In this situation, depicted in FIG. 5, the input to the base model consists of the new data record as well as all Concise Profile variables. This has the potential to create a high performance system (i.e. one attaining a high level of fraud detection) because all of the available information is accessible to the mathematical model at the same time. One drawback, however, is that the internal operation of the base model necessarily changes if the Concise Profile variables contain information which help to discriminate between fraud and nonfraud records. If this change in the base model is not desired or not feasible, then the configuration of FIG. 4 described above may be preferred. In the system of FIG. 4 the base model remains unchanged by the addition of the Concise Profile variables into the system.

Figure 6:
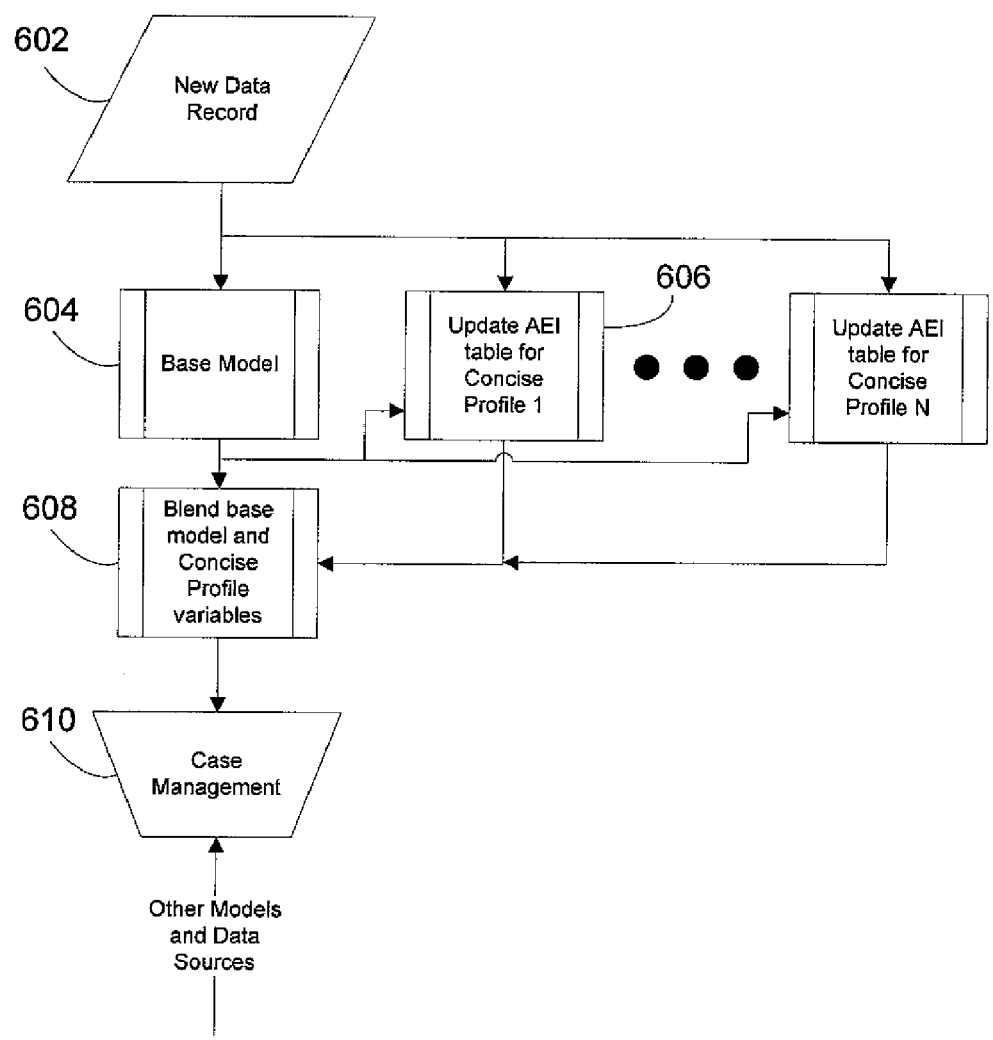
FIG. 6 shows a possible configuration of the system in which the Concise Profile variables are used to augment a base model and the output of the base model is used as additional input for the updating of the AEI table.

On the other hand, one can consider an alternative modification of the system in FIG. 4. The base model remains unchanged but its output is used to create one or more of the Concise Profile variables. This is depicted in FIG. 6 in which the output of step 604 is used at the input to step 606. The Concise Profiles are able to incorporate into their variables the score or scores from the base model as well as the variables created by the base model.

Figure 7:
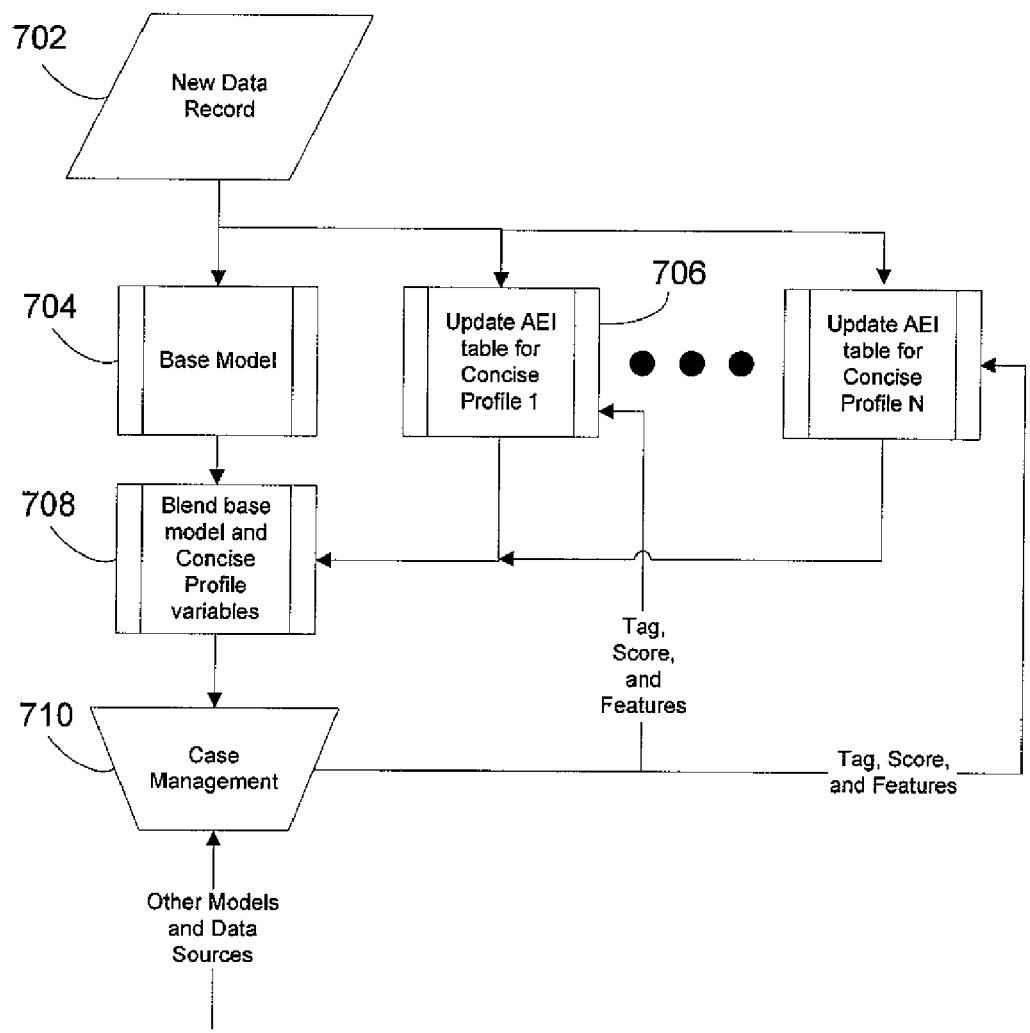
FIG. 7 shows a possible configuration of the system identical to that shown in FIG. 4 except for the addition of feedback loops.

When the Concise Profiles are used to augment a base model it may still be beneficial to incorporate feedback into the updating of the AEI tables, for the same reasons as those mentioned above in the discussion in reference to FIG. 3. Whether the Concise Profiles form the core of the system or augment a base model, the purpose of the feedback is to allow the system to rapidly incorporate new information on changing fraud patterns. FIG. 7 shows a configuration in which feedback is used to update the Concise Profile variables which are then blended with the base model output.

Figure 8:
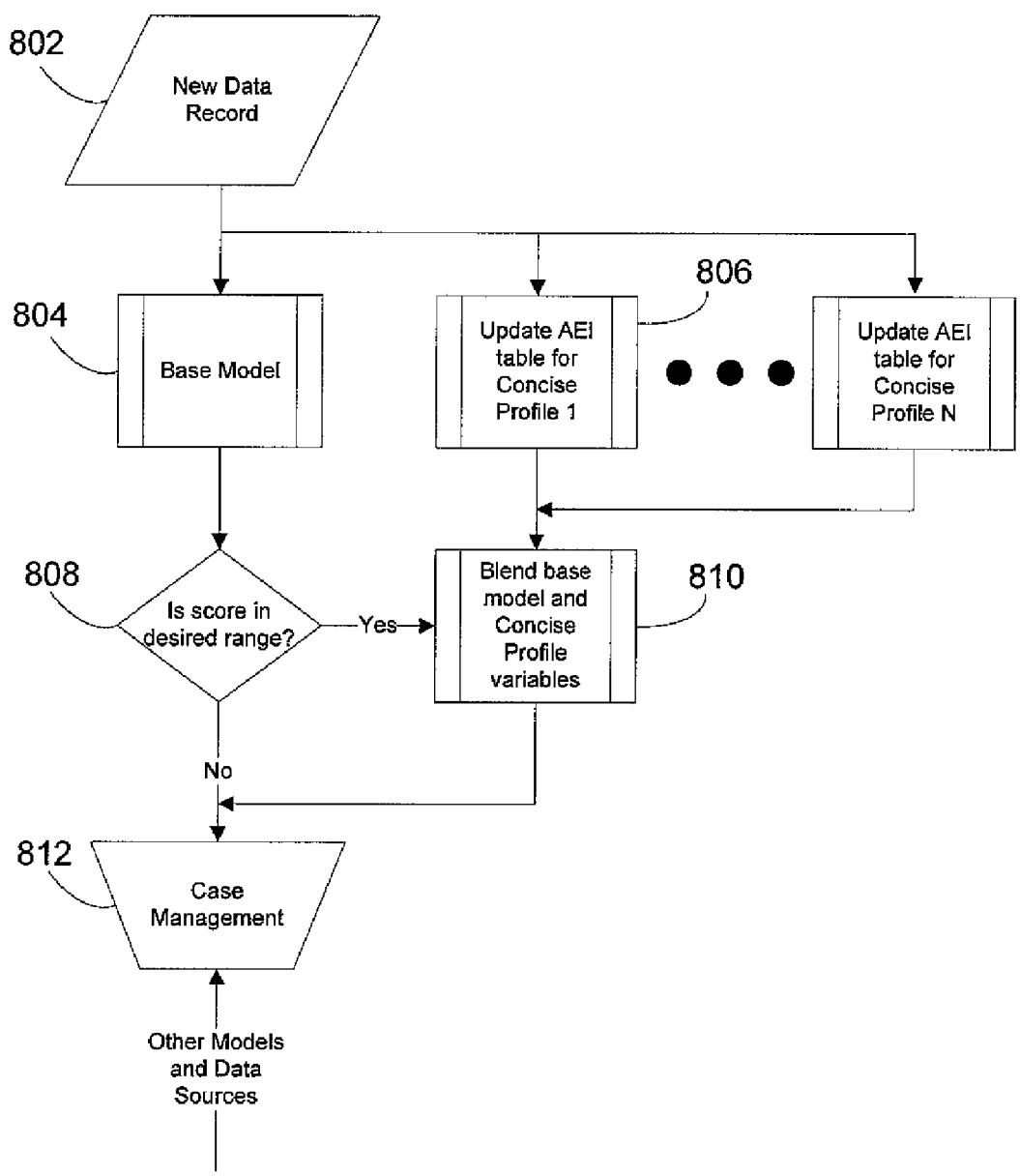
FIG. 8 shows a possible configuration of the system in which the Concise Profile variables are used to augment a base model only when the base model score lies in a desired range.

It may be desirable to configure the fraud detection system such that the Concise Profile variables are used to augment a base model only under certain conditions. The final score sent to the case management step could be the base model score itself except when this score is in a desired range. The desired range can be set, for example, to be the score range in which business operating points are set and where the accuracy of the predictions are the most crucial. This configuration of the system is illustrated in FIG. 8. It is similar to the system described in reference to FIG. 4 except for the addition of the decision step 808. At step 808 the base model score is examined. If the score is in the desired range then the base model output is sent to step 810 and blended with the Concise Profile variables. In this situation the score sent to the case management step 812 is a blending of the base model output and the Concise Profile variables. If, however, the base model score is not in the desired range then the score sent to the case management step 812 is the unmodified base model score. In this configuration of the system, the Concise Profile variables are able to improve the performance of the fraud detection system by augmenting the base model only when augmentation can be most beneficial.

Figure 9:
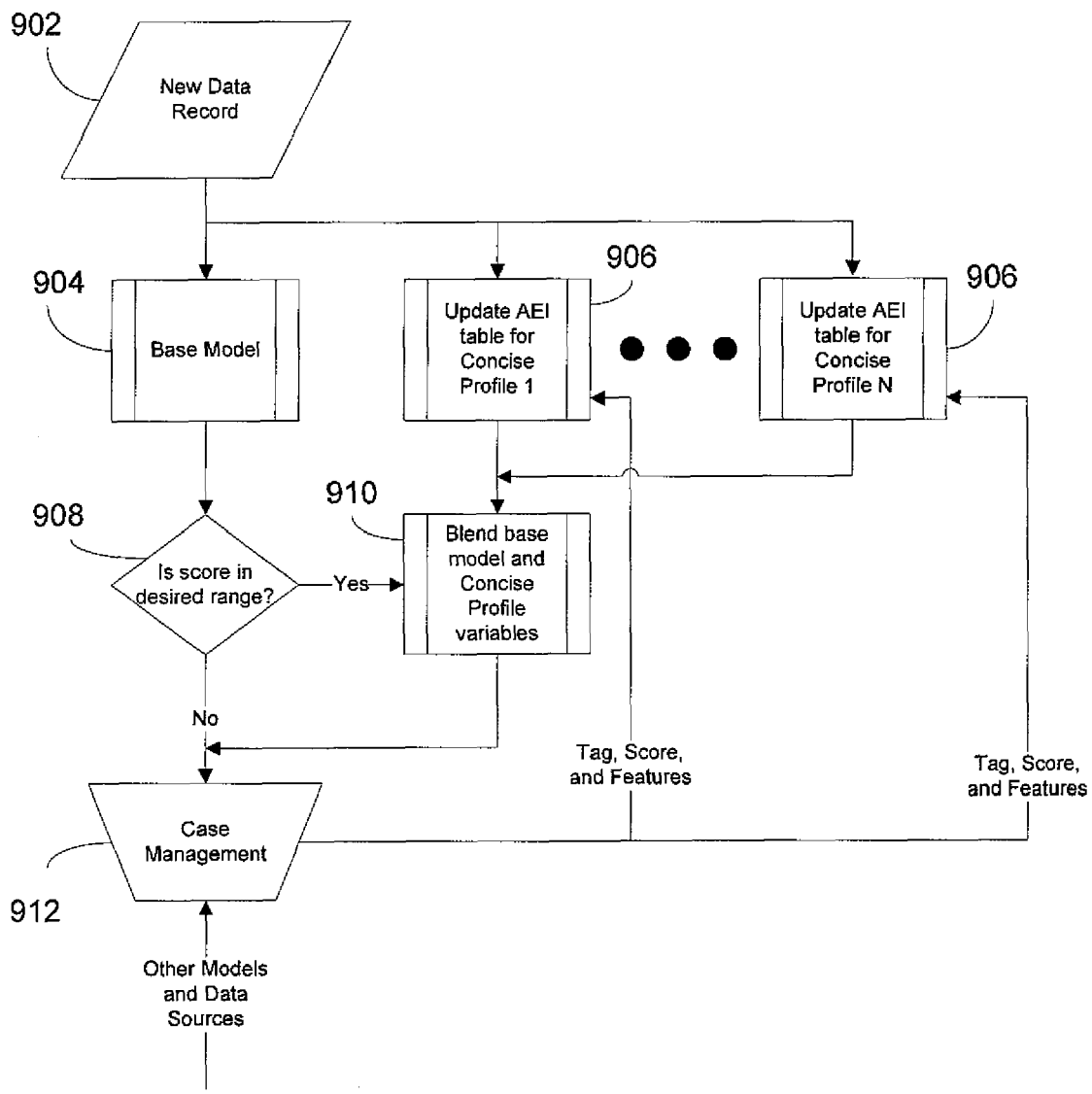
FIG. 9 shows a possible configuration of the system identical to that shown in FIG. 8 except for the addition of feedback loops.

FIG. 9 shows another system that is similar to the system described in reference to FIG. 4 and FIG. 8, except for the addition of the decision step 908 and a feedback loop. At step 908 the base model score is examined. If the score is in the desired range then the base model output is sent to step 910 and blended with the Concise Profile variables. In this situation the score sent to the case management step 912 is a blending of the base model output and the Concise Profile variables. If, however, the base model score is not in the desired range then the score sent to the case management step 912 is the unmodified base model score. When a feedback loop is added to the system, the result is the system illustrated in FIG. 9. Many other system configurations of various combinations of the main features described above (e.g. multiple Concise Profiles, feedback loops, blending based on a score range, concise Profile variables used as input to base model, base model output used as input to AEI table updates, etc.) can be implemented.

In any of the configurations described above, specific statistics calculated on the subset of entities represented in the AEI tables can be used to identify entities exhibiting anomalous behavior. We refer to this analysis on the AEI table as Automatic Identity Identification (AII). Consider the example of using the ATM entity class in a fraud detection system. The AEI table will contain a small subset of ATMs deemed riskier than other ATMs in the data. If the average number of transactions per hour with amount greater than $300 at a particular ATM is indicative of fraud, then this quantity can be calculated across all entities in the AEI table. The table of FIG. 10 shows a simple example in which most of the ATMs have a value in the range two to four of this quantity. One of the ATMs, however, has a value 15.4, much larger than the average value. If outliers such as this have a value which is greater than, for example, ten standard deviations away from the mean value of the statistic being calculated, then the system has identified (hence the term Automatic Identity Identification) an extreme outlier (i.e. an ATM exhibiting the riskiest behavior) and can report it to a human fraud analyst or police authorities for further investigation or immediate action. This type of identification and reporting of outliers would be difficult to achieve for a traditional fraud detection system that uses a full profile database given the computational expense of running regular queries on the full set of ATMs and having only limited views of the fraud characteristics. Doing Automatic Identity Identification analysis on several small concise profile tables enables fast and efficient detection of outliers at a variety of dimensions associated with the fraud behaviors.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:
1. A computer-implemented method comprising:
defining a first subset of entities belonging to one or more entity classes;
constructing at least one historical profile for each entity in the subset of entities based on a set of possible outcomes of transaction behavior of each entity in the first subset of entities;
based on the historical profiles, selecting a second subset of entities having transaction behavior associated with a transaction, the transaction behavior being predictive of at least one targeted outcome from a set of possible outcomes;
redefining the first subset of entities with the second subset of entities; and
monitoring the historical profiles for the entities to find entities for which the behavior is so significantly differ- ent than normal as to indicate a high probability that the entity is involved in a fraud process that is to be reported to humans.

2. The computer-implemented method of claim 1, wherein the targeted outcome is selected from the set of possible outcomes that consists of a desirable outcome and an undesirable outcome.

3. The computer-implemented method of claim 1, wherein the targeted outcome includes fraud in connection with the transaction behavior.

4. The computer-implemented method of claim 1, wherein at least one entity class includes automatic teller machines.

5. The computer-implemented method of claim 1, further comprising:
generating at least one score related to the transaction based on one or more mathematical models; and
combining the at least one score with information of the transaction behavior to generate a probability of the targeted outcome.

6. The computer-implemented method of claim 1, further comprising:
for each transaction, generating at least one score related to the transaction based on one or more mathematical models; and combining the at least one score with information from historical profiles for the entities involved in the transaction to produce a more accurate score.

7. The computer-implemented method of claim 6, wherein the historical profiles are used only if the at least one score is within a predetermined range of values that indicate a high probability of the targeted outcome.

8. The computer-implemented method of claim 1, further comprising generating an estimate of the probability of the targeted outcome based only on the historical profiles.

9. The computer-implemented method of claim 1, in which the values in the historical profile for an entity are computed using information from transaction records that involved that entity.

10. The computer-implemented method of claim 9, in which the values in the historical profile for an entity are computed using input variables and output scores computed for the transaction records by one or more mathematical models.

11. The computer-implemented method of claim 1, in which some or all of the values in the historical profile for an entity are computed using feedback of transaction records that involve that entity and that have been delayed until the actual outcome for that transaction is known.

12. A computer-implemented method comprising:
defining a first subset of entities belonging to one or more entity classes;
constructing at least one historical profile for each entity in the subset of entities based on a set of possible outcomes of transaction behavior of each entity in the first subset of entities;
based on the historical profiles, selecting a second subset of entities having transaction behavior associated with a transaction, the transaction behavior being predictive of at least one targeted outcome from a set of possible outcomes; and
redefining the first subset of entities with the second subset of entities, the transaction behavior being predictive of at least one targeted outcome from the set of possible outcomes is a high value for a decayed frequency which selects entities with recent frequent transactions, where the decayed frequency for each entity represented in the table is recomputed on every input transaction according to the equation $$f_j = \alpha \times f_{j-1} + \beta_j$$

where $f_j$ and $f_{j-1}$, are the values of the decayed frequency for a particular entity represented in the table after the j'th and (j−1)'th transactions, $\alpha$ is a value between zero and one, and $\beta_j$ is zero if the j'th transaction did not involve the particular entity for which the decayed frequency is being computed or one if the j'th transaction did involve the particular entity for which the decayed frequency is being computed.

13. A computer-implemented system having a processor that is responsive to program code, the system comprising:
code to define a first subset of entities belonging to one or more entity classes;
code to construct at least one historical profile for each entity in the subset of entities based on a set of possible outcomes of transaction behavior of each entity in the first subset of entities;
based on the historical profiles, code to select a second subset of entities having transaction behavior associated with a transaction, the transaction behavior being predictive of at least one targeted outcome from the set of possible outcomes;
code to redefine the first subset of entities with the second subset of entities; and
code to monitor the historical profiles for the entities to find entities for which the behavior is so significantly different than normal as to indicate a high probability that the entity is involved in a fraud process that is to be reported to humans.

14. The computer-implemented system of claim 13, wherein the targeted outcome is selected from the set of possible outcomes that consists of a desirable outcome and an undesirable outcome.

15. The computer-implemented system of claim 13, wherein the targeted outcome includes fraud in connection with the transaction behavior.

16. The computer-implemented system of claim 13, wherein at least one entity class includes automatic teller machines.

* * * * *